(12) United States Patent
Andrzejewski et al.

(10) Patent No.: US 12,210,629 B2
(45) Date of Patent: Jan. 28, 2025

(54) INCIDENT CONFIDENCE LEVEL

(71) Applicant: Sumo Logic, Inc., Redwood City, CA (US)

(72) Inventors: David M. Andrzejewski, San Francisco, CA (US); Bashyam Tca, Walnut Creek, CA (US); Joshua Richard Williams, Austin, TX (US)

(73) Assignee: SUMO LOGIC, INC., Redwood City, CA (US)

(*) Notice: Subject to any disclaimer, the term of this patent is extended or adjusted under 35 U.S.C. 154(b) by 233 days.

(21) Appl. No.: 18/147,385

(22) Filed: Dec. 28, 2022

(65) Prior Publication Data

US 2024/0220629 A1    Jul. 4, 2024

(51) Int. Cl.
*G06F 21/57* (2013.01)
*G06F 21/55* (2013.01)
*G06N 20/00* (2019.01)

(52) U.S. Cl.
CPC .......... *G06F 21/577* (2013.01); *G06F 21/554* (2013.01); *G06N 20/00* (2019.01); *G06F 2221/034* (2013.01)

(58) Field of Classification Search
CPC ............... G06F 21/577; G06F 21/554; G06F 2221/034; G06F 21/552; G06N 20/00; H04L 63/1425
See application file for complete search history.

(56) References Cited

U.S. PATENT DOCUMENTS

| | | | |
|---|---|---|---|
| 2017/0213139 A1* | 7/2017 | Sawant | G06N 5/043 |
| 2018/0096107 A1* | 4/2018 | Demestichas | G16H 50/70 |
| 2018/0367561 A1 | 12/2018 | Givental et al. | |
| 2019/0166144 A1 | 5/2019 | Mirsky et al. | |
| 2020/0057850 A1* | 2/2020 | Kraus | G06F 21/552 |
| 2020/0334498 A1* | 10/2020 | Pan | G06F 17/15 |
| 2020/0367974 A1* | 11/2020 | Khalid | A61B 34/20 |
| 2021/0049487 A1* | 2/2021 | Desouky | G06N 5/04 |
| 2021/0136089 A1 | 5/2021 | Costea et al. | |
| 2021/0279632 A1* | 9/2021 | Di Pietro | G06N 5/04 |
| 2021/0326744 A1 | 10/2021 | Israel et al. | |
| 2022/0198322 A1 | 6/2022 | Kuperman et al. | |
| 2022/0318082 A1* | 10/2022 | Slinger | G06F 11/2263 |
| 2024/0121242 A1* | 4/2024 | Miyake | H04L 63/102 |

OTHER PUBLICATIONS

"European Application Serial No. 23218213.9, Extended European Search Report mailed Mar. 20, 2024", 9 pages.

* cited by examiner

*Primary Examiner* — El Hadji M Sall
(74) *Attorney, Agent, or Firm* — Schwegman Lundberg & Woessner, P.A.

(57) ABSTRACT

Methods, systems, and computer programs are presented for automatic evaluation of security incidents. One method includes receiving a resolution status, for a set of insights, indicating if each insight was a true or a false positive. A global training set, comprising the resolution status for the insights, is generated, and a local training set with a subset of the insights associated with a first user. A machine-learning (ML) program is trained, using the global training set, to obtain a global model, and using the local training set to obtain a local model for the first user. When a new insight for the first user is detected, a global score is obtained using the global model, and a local score is obtained using the local model. A confidence score, calculated based on the global and local scores, is presented as an indication of an estimated severity of the new insight.

20 Claims, 11 Drawing Sheets

FIG. 1

FEATURES

502

- 504 — TENANT ID
- 506 — VENDOR ID
- 508 — OBJECT TYPE
- 510 — ENTITY ID
- 512 — MITRE TACTIC SET
- 514 — RULE HASH SERIES
- 516 — CUSTOM RULE SEVERITY
- 518 — RULE ID SEVERITY
- 520 — CUSTOMER RULE ID
- 522 — INSIGHT THRESHOLD
- 524 — INSIGHT OUTCOME

FIG. 5

| NUMBER DATA POINTS PER USER (LAST 30 DAYS) | INTERNAL LABELING OF CUSTOMERS | PREDICTION BEHAVIOR (PREVIOUSLY SEEN VENDOR RULES) | PREDICTION BEHAVIOR (PREVIOUSLY UNSEEN VENDOR RULES) | PREDICTION BEHAVIOR (PREVIOUSLY SEEN USER RULES) | PREDICTION BEHAVIOR (PREVIOUSLY UNSEEN USER RULES) |
|---|---|---|---|---|---|
| 0-50 | N/A | GLOBAL MODEL | GLOBAL MODEL (NO FEATURES USED BY UNSEEN VENDOR RULES) | GLOBAL MODEL (NO FEATURES USED FOR SEEN USER RULES) | GLOBAL MODEL (NO FEATURES USED BY UNSEEN USER RULES) |
| MORE THAN 50 | TRAINABLE TENANTS | LOCAL AND GLOBAL MODEL ENSEMBLE | LOCAL AND GLOBAL MODEL ENSEMBLE (NO FEATURES USED FROM UNSEEN VENDOR RULES) | LOCAL AND GLOBAL MODEL ENSEMBLE | LOCAL AND GLOBAL MODEL ENSEMBLE (NO FEATURES USED FROM UNSEEN USER RULES) |

FIG. 8

INCIDENT CONFIDENCE LEVEL

TECHNICAL FIELD

The subject matter disclosed herein generally relates to methods, systems, and machine-readable storage media for automatic evaluation of security-related incidents.

BACKGROUND

Security analysts work to make sure that IT environments remain safe from outside attackers. The security analyst typically analyzes information generated by multiple systems to detect trouble, either because of an attack, but also because a system may be malfunctioning and becoming vulnerable.

For example, security analysts look at log information that may indicate problems, such as logs indicated in error condition. Additionally, analysis tools are used to process some of the log information in order to detect potential problems and report to the security analyst.

There are several challenges for the security analyst. A first problem is the existence of blind spots where attacks may take place due to gaps in the automatic detection of problems. Second, manual workflows to process potential security threats may be slow and inefficient, and older legacy tools may lead to long investigations and response times. Third, alert fatigue may creep in because of the generation of too many alerts, resulting in too much time spent chasing low-priority security alerts as well as false threats.

BRIEF DESCRIPTION OF THE DRAWINGS

Various of the appended drawings merely illustrate example embodiments of the present disclosure and cannot be considered as limiting its scope.

FIG. 1 is a user interface (UI) for presenting insights on security incidents, according to some example embodiments.

FIG. 5 illustrates sample features for building machine-learning (ML) models, according to some example embodiments.

FIG. 8 is a table illustrating the use of local and global models based on the availability of user and vendor rules, according to some example embodiments.

DETAILED DESCRIPTION

Figure 2:
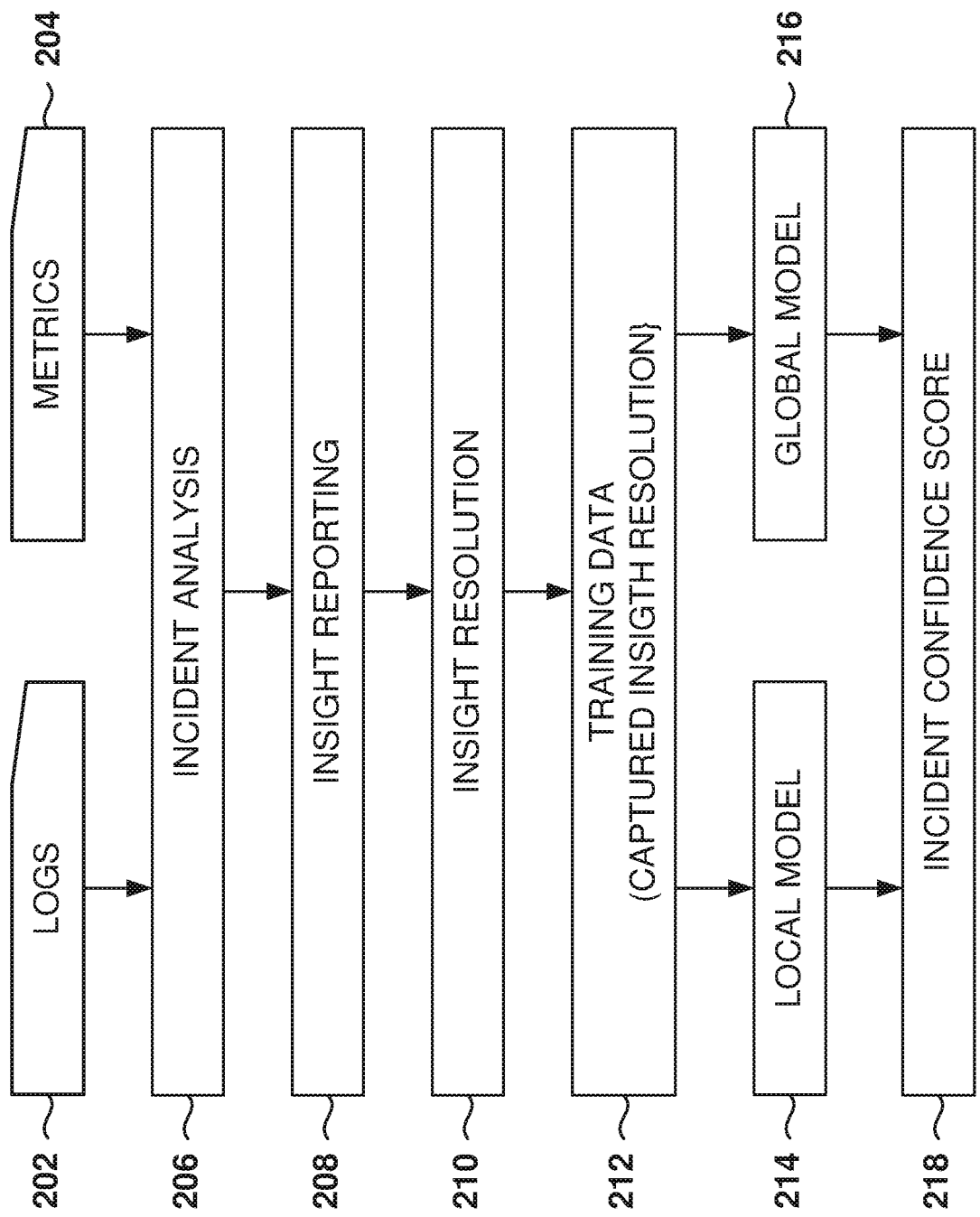
FIG. 2 illustrates the process of calculating the incident confidence score, according to some example embodiments.

Example methods, systems, and computer programs are directed to automatic evaluation of security-related incidents. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

One general aspect includes a method that includes an operation for receiving, by an analysis platform, a resolution status for a plurality of insights generated by the analysis platform, the resolution status indicating if each insight was a true positive or a false positive. Further, the method includes generating a global training set comprising the resolution status for the plurality of insights, and generating a local training set comprising the resolution status for a subset of the plurality of insights associated with a first user. The method further includes operations for training, using the global training set, a machine-learning program to obtain a global model, and training, using the local training set, a machine-learning program to obtain a local model for the first user. When the analysis platform detects a new insight for the first user, a global score for the new insight is obtained, using the global model, and a local score for the new insight is obtained using the local model. Further, a confidence score is calculated for the new insight based on the global score and the local score, the confidence score being an indication of an estimated severity of the new insight, and the new insight and the confidence score are presented on a display.

Figure 1:
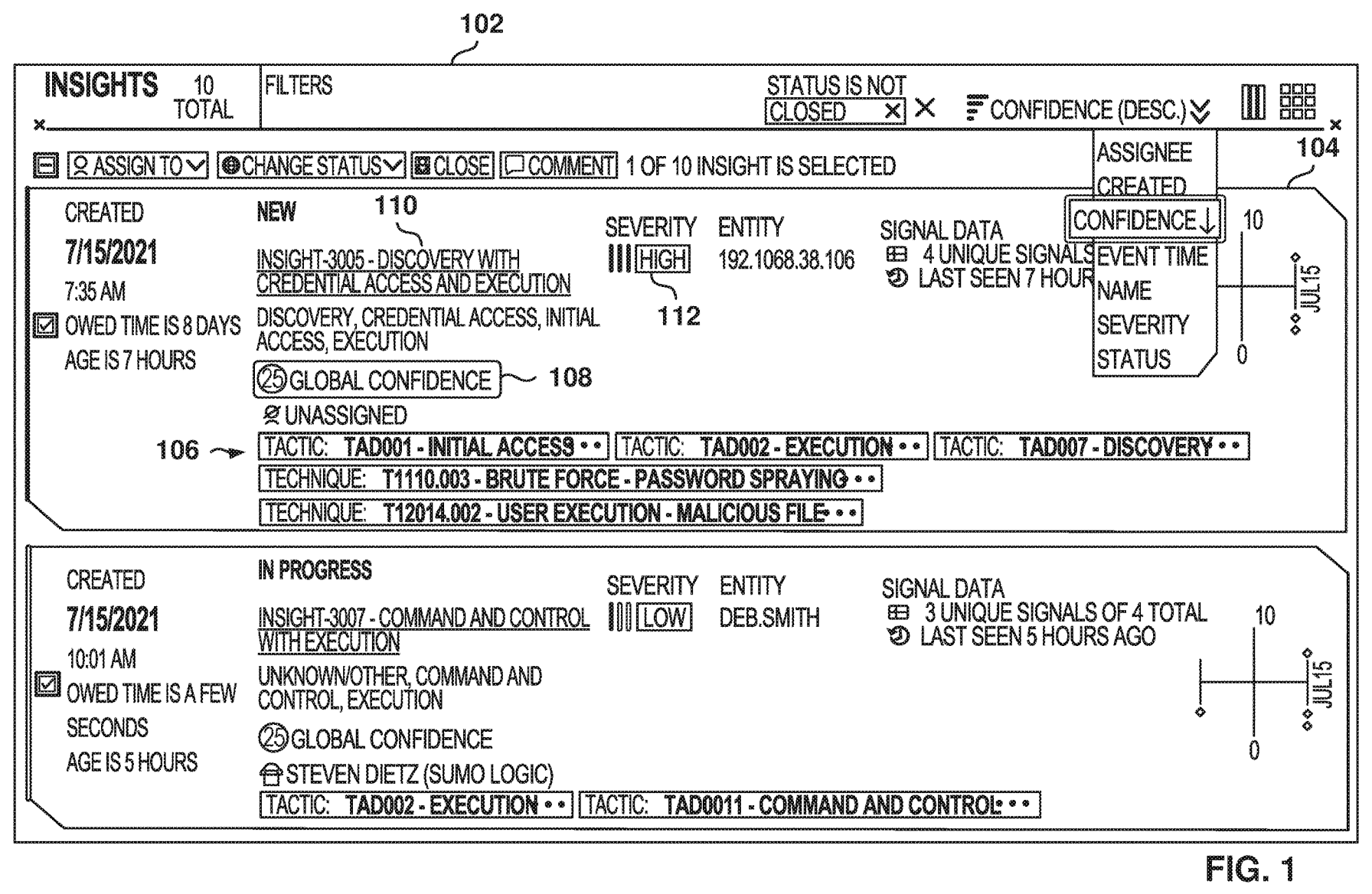

FIG. 1 is an insights user interface 102 for presenting information on security incidents, according to some example embodiments. In some example embodiments, the insights system analyzes security incidents, also referred to as security events, from different sources and stores the results as records (that include raw data). These records are then matched against a set of rules, and the rules may be unique for each computer-equipment vendor. Typically, the rules are configurable, and the user may customize these vendor-provided rules to their environment. Thus, there may be system rules and user-customized rules. Typically, the rules can be of two kinds: match-based rules and count-based rules. Each of the rules has a severity weight associated with it.

When a rule is fired by incoming data (e.g., record data) then a signal is generated that has a certain severity weight. A signal is a collection of alerts, identified through pattern matching, correlation logic, a statistical evaluation, and anomaly detection of log data. The signals may be combined, and an insight is generated when a set of signals for an entity, for a certain period, has a total sum of severity weights exceeding a predetermined threshold (e.g., the severity total exceeds a severity total of 15 for data from the last 14 days). The insights system uses an adaptive signal clustering algorithm to automatically group related signals to accelerate alert triage.

This kind of multi-reduction step based on different dimensions and time periods helps in reducing millions of alerts to a few that are critical and should be analyzed by a security expert. To help the security analyst, the insights system calculates a confidence score 108 for each insight that reflects the estimated severity of the insight. For example, the confidence level is an integer in the range from 1 to 99, with the higher the confidence level, the higher the level of danger for the threat.

The insights user interface 102 presents information for several insights 104, including the insight name 110, the confidence score 108, a severity grade 112 (e.g., high, medium, or low), and tactics 106 with suggestions for solving the problem.

The confidence score 108 is the probability that the insight is a real threat, which is referred to as a true positive. If the threat is not a real threat, then the threat would be considered a false positive. Thus, the confidence score 108, combined with the severity grade 112, provides an indication to the security analyst on the urgency of responding to the incident.

FIG. 2 illustrates the process of calculating the incident confidence score, according to some example embodiments. The data collection and analysis platform ingests log data 202, which may be also saved as metrics data 204, and generates insights. A typical customer may be ingesting millions of logs in a week, and the analysis platform generates the signals when suspicious patterns are found.

For example, a user may log in to the system in the United States and then log in again two minutes later in China. A rule detects this suspicious pattern and generates a signal. The security expert then has to analyze this signal and check if it is a real threat.

However, there could be hundreds or thousands or these signals, so the process to sort through them can be very expensive in the use of resources, both human and computing. If there are many signals attached to a single entity within a certain period of time, then it is assumed that some event of interest occurred, and the analysis platform generates an insight in the incident analysis 206 operation. An entity could be a host, a user account, a firewall, a network switch, a database, a virtual machine, or any other kind of resource in the computing environment. The insight reporting 208 is then performed.

The security analyst then uses the information from the insight to find out what caused the problem. After the security analyst makes a determination on the insight, (e.g., there is a hard drive malfunctioning, a host is under attack, a network switch is down), the result is saved in the system and the analysis platform captures the insight resolution 210.

However, there could be hundreds or thousands of signals, and hundreds of incident reports, so it may be a daunting task to sort through all the potential problems. To assist the security analyst, the analysis platform analyzes each insight and provides an estimated severity and a global confidence score.

The global confidence score, also referred to simply as confidence score, represents a level of confidence, predicted by the analysis platform, that the insight is actionable. In some example embodiments, the confidence score is a value in a scale of 0 to 100, where a higher score indicates higher confidence that the insight is actionable. If the analysis platform does not have enough information, it will not make a prediction and no confidence score is reported with the insight.

The confidence score is generated based on the underlying pattern of signals in the insight. The model compares this pattern to previously observed patterns from insights that were closed with either a false positive (e.g., there was not a real threat) or a resolved resolution (e.g., a problem was detected).

The analysis platform makes comparisons across the global installed base of users to generate a confidence score based on the patterns seen at any user. In addition, the analysis platform customizes scores for insights for each user based on customized content from the user, including tuned and custom rules.

To obtain the confidence score, one or more machine-learning (ML) models are used. Each model provides a score regarding the probability that the insight is a true positive, that is, the insight was a real problem and not a false alarm.

At operation 212, training data is used to form a training set to train each model. The training data includes information regarding the captured insight data entered by security analysts that analyzed reported insights.

In some example embodiments, there is a global model 216 that uses training data from several users, and a local model 214 that uses training data for a particular user. More details about the training data are provided below with reference to FIGS. 5 and 6.

The scores from the local model 214 and the global model 216 are combined to generate the confidence score 218 of future incidents. More details about the use of the local model 214 and the global model 216 are provided below with reference to FIG. 7.

Figure 3:
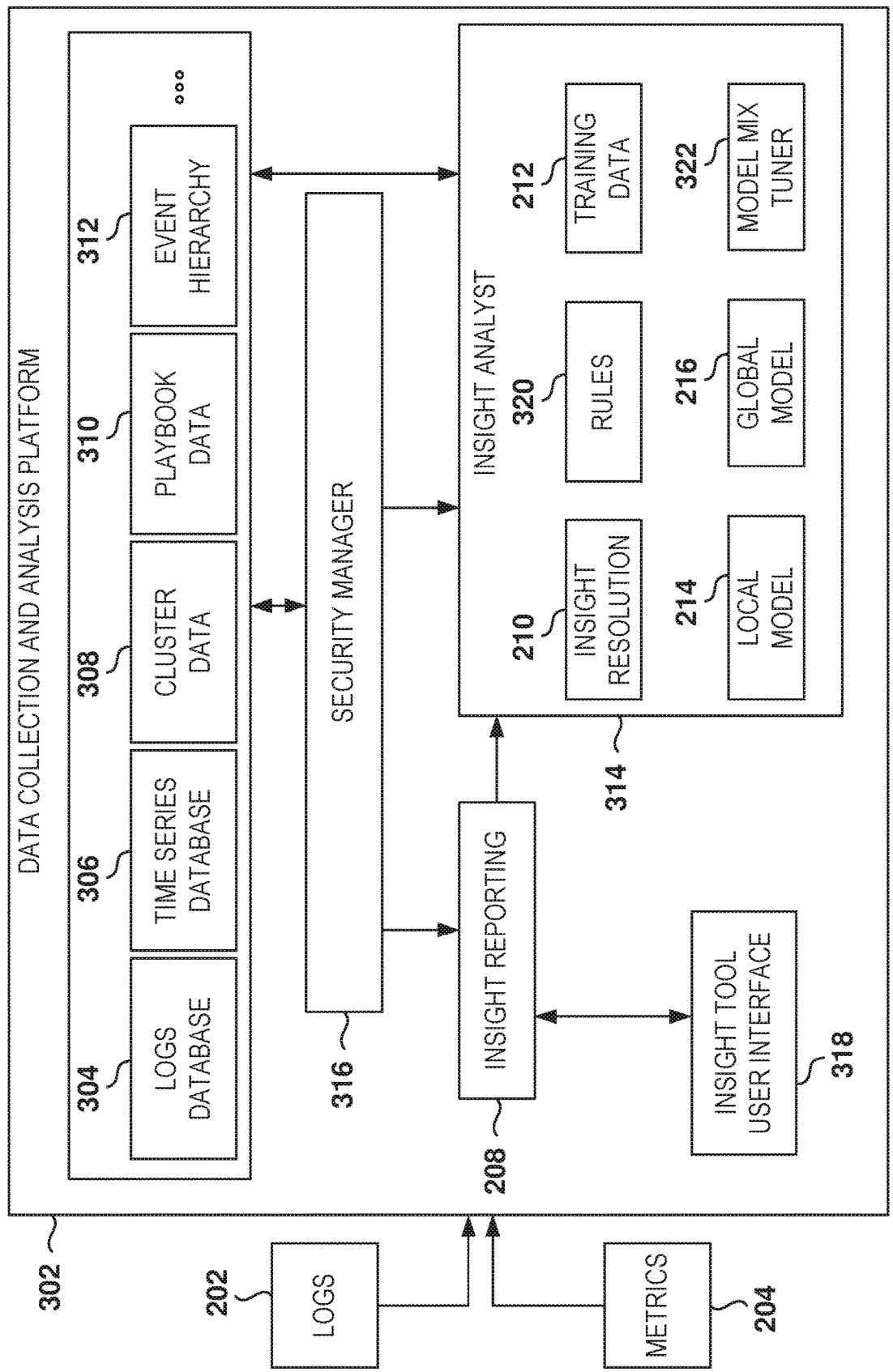
FIG. 3 is an architecture for an incident analysis tool, according to some example embodiments.

FIG. 3 is an architecture for an incident analysis tool, according to some example embodiments. The data collection and analysis platform 302 continuously collects information (log data 202 or metrics data 204) and analyzes, classifies, and stores the information. Another type of source data may include traces (not shown). For example, the data collection and analysis platform 302 stores the data in the logs database 304 or time series database 306. Further, the signatures of incoming logs are analyzed to generate cluster data 308, playbook data 310, event hierarchy data 312, etc.

The incoming log data 202 and metrics data 204 are processed for storage and generation of information, and also processed by the security manager 316 to detect problems and report incidents.

An incident analyst 314 generates insights and provides the confidence score for the insights. The insight reporting 208 module reports the insights on the insight tool user interface 318.

The incident analyst 314 generates insight based on analysis of the log data, and uses rules 320 to generate the insights. When a rule 320 is triggered based on identified signals, the insight is generated. Further, the confidence score 218 is calculated based on scores provided by the local model 214 and the global model 216, which are combined by the model mix tuner 322 to produce the confidence score 218.

Figure 4:
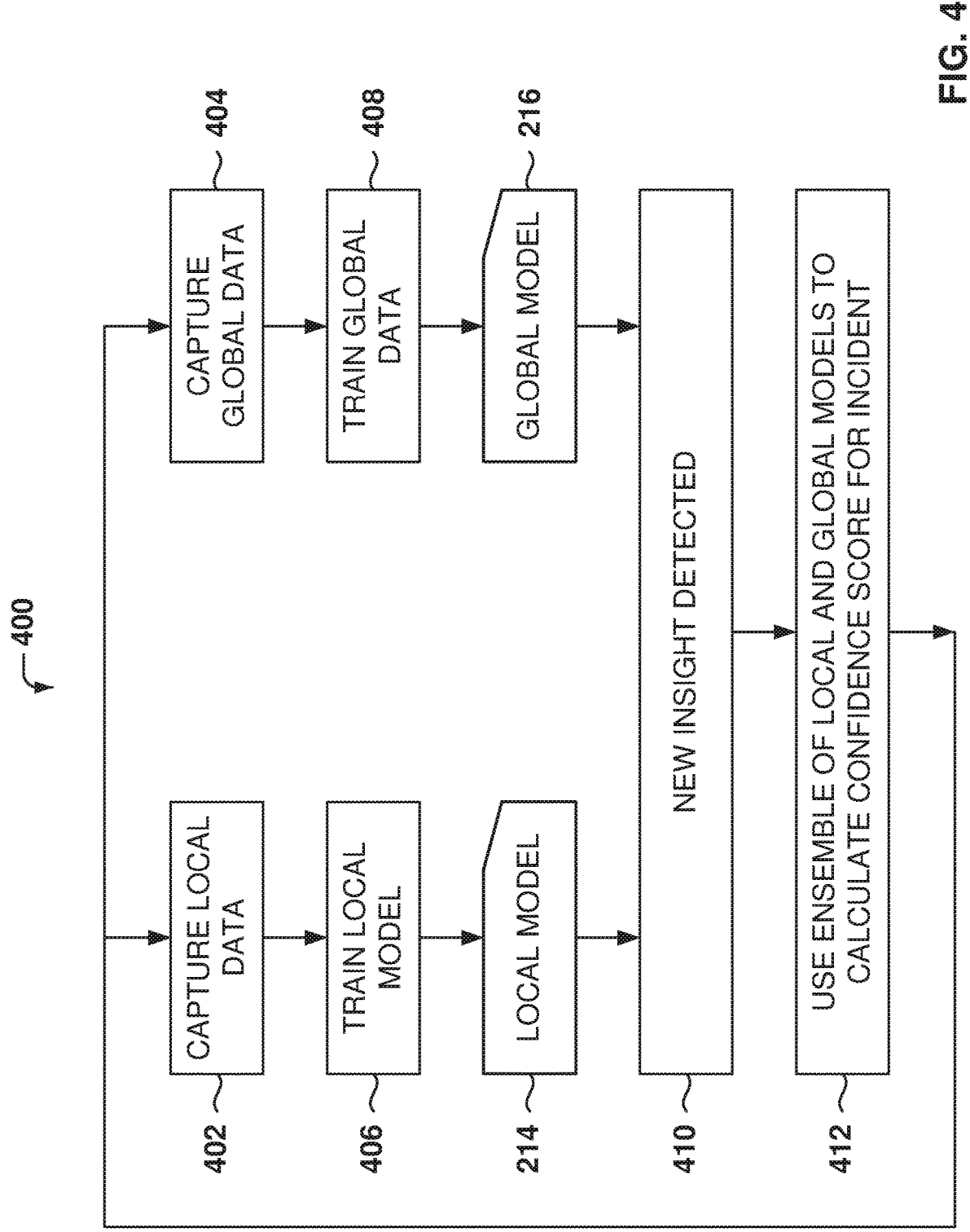
FIG. 4 is a flowchart of a method for utilizing local and global models to calculate incident confidence scores, according to some example embodiments.

FIG. 4 is a flowchart of a method 400 for utilizing local and global models to calculate incident confidence scores, according to some example embodiments. While the various operations in this flowchart are presented and described sequentially, one of ordinary skill will appreciate that some or all of the operations may be executed in a different order, be combined or omitted, or be executed in parallel.

At operation 402, the local data is captured for the local training set and, at operation 404, the global data is captured for the global training set. Afterwards, at operation 406, the local model is trained with the local training data to obtain the local model 214. At operation 408, the global model is trained with the global training data to obtain the global model 216.

At operation 410, a new insight is detected. From operation 410, the method 400 flows to operation 412 to calculate the confidence score for the new incident using an ensemble of the scores provided by the local and global models. In some cases, there is not enough data to generate a local model (e.g., for a new user), so only the global model is used to calculate the confidence score until sufficient data is available to generate the local model.

In some example embodiments, a tuning parameter a is used to combine the scores. The α may be tuned over time. For example, for new customers without a history of insight resolutions, the α is set so only the global model is used. After there is enough data to generate the local model 214, then α is used to provide weights to the scores. For example, the confidence score CS of an insights i is calculated as follows:

$$CS(i) = (1 - \alpha)L(i) + \alpha \cdot G(i) \qquad (1)$$

In this equation, L(i) is the local-model insight score provided by the local model and G(i) is the global-model insight score from the global model. For a new customer, α is set to 1 so only the G(i) is used. After the local model is available, alpha may be given an initial value (e.g., 0.9) and after time goes on and the user obtains additional insight resolutions, the α may be gradually reduced to provide more weight to the local score.

The benefit of using the local model is that different users may have different processes, different types of problems, etc., so the local model may capture some of these idiosyncrasies for the different users. For example, an email that may be considered spam for one user may be a regular email used by another user.

FIG. 5 illustrates sample features for building machine-learning (ML) models, according to some example embodiments. The training data is a structure to store data of values for features 502 used by the ML model. A feature 502 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

In some example embodiments, the values of the features are combined in a vector. In some embodiments, the vector uses one-hot encoding for one or more features that are categorical, that is, the categorical feature may include one from a finite set of possible values. Each possible value is encoded as a logical value of 1 in one of the positions of the vector. In other embodiments, the categorical values may be encoded in smaller vectors (e.g., an integer).

All the vectors from the different values are combined into a matrix that is used as the training set for training the model, that is, each vector occupies a row of the matrix.

In some example embodiments, the training set includes any combination of the following features 502:

Tenant identifier (ID) 504 is an identifier of the user of the system (e.g., a tenant of the service provider);

Vendor ID 506; ID for the vendor associated with the insight (e.g., vendor that manufactured a firewall or a host system);

Object type 508 identifies the data source for the insight, such as an endpoint, a firewall, a system, a virtual machine, a hard drive, etc.;

Entity ID 510 is the identifier for the entity associated with the insight, such as an application, a service, an infrastructure element, a microservice, etc.;

Mitre tactic set 512 contains a one-hot encoding for different MITRE ATT&CK patterns in the insight; that is, the Mitre tactic set 512 identifies the list of Mitre tactics detected;

Rule hash series 514 contains a one-hot encoding for different hashes of rules that triggered the insight;

Custom rule severity 516 is the sum of the severity values for the custom rules in an insight;

Rule ID severity 518 containing a sum of severity for a particular rule in an insight;

Customer rules ID 520 is a sum of the severities for the custom rules in an insight;

Insight threshold 522 is a tunable parameter (e.g., between zero and one) that determines if an insight is reported, such that insights with a confidence score below the insight threshold 522 are not presented to the user, or presented with a low severity indicator; and Insight outcome 524 indicates if the resolution of the insight was that an actual problem was detected (e.g., a true positive) or if the insight was not an actual problem (e.g., a false positive).

It is noted that the features identified above are examples and do not describe every possible embodiment. Other embodiments may utilize different features, additional features, or combined features. The embodiments illustrated in FIG. 5 should therefore not be interpreted to be exclusive or limiting, but rather illustrative.

The severity value of a rule is a score that indicates the severity of the threat identified by the rule, and is a value within a range (e.g., from 1 to 99, from 1 to 5, from 1 to 10).

The MITRE ATT&CK (Adversarial Tactics, Techniques and Common Knowledge) is a framework, set of data matrices, and assessment tool developed by MITRE Corporation to help organizations understand their security readiness and uncover vulnerabilities in their defenses. The MITRE ATT&CK Framework uses real-world observations to documents specific attack methods, tactics, and techniques. As new vulnerabilities and attack surfaces come to light, they are added to the ATT&CK framework, which thus is constantly evolving. The Mitre tactic set 512 represents the subject matter expertise of security experts and provides a classification or taxonomy of the kinds of things that attackers might try.

The rule hash series 514 include the information about the rules that triggered the insight and additional metadata associated with those rules, such as the names of objects identified in the rules (e.g., vendor IDs). In one example embodiment, there may be about 400 rules in the system that can trigger insights, but other embodiments may include thousands of rules.

In some example embodiments, filtering is used to eliminate some features that may not be useful for building the models. For example, rare values of features are not useful to learn from because they do not happen often. For example, for the list in the Mitre tactic set 512, a few selected tactics are kept while others are eliminated from further processing. In one example, the Mitre tactics of interest include the following:

['mitre_Command and Control', 'mitre_Discovery', 'mitre_Persistence', 'mitre_Defense Evasion', 'mitre_Execution', 'mitre_Initial Access', 'mitre_Collection', 'mitre_Credential -continued Access', 'mitre_Unknown/Other', 'mitre_Lateral Movement', 'mitre_Exfiltration', 'mitre_Privilege Escalation', 'mitre_Impact', 'mitre_Reconnaissance', 'mitre_Resource Development']

During the inference process, all the features may be used as input to the model except the insight outcome 524, and the model generates the insight outcome 524 as the output, which is the confidence score.

Figure 6:
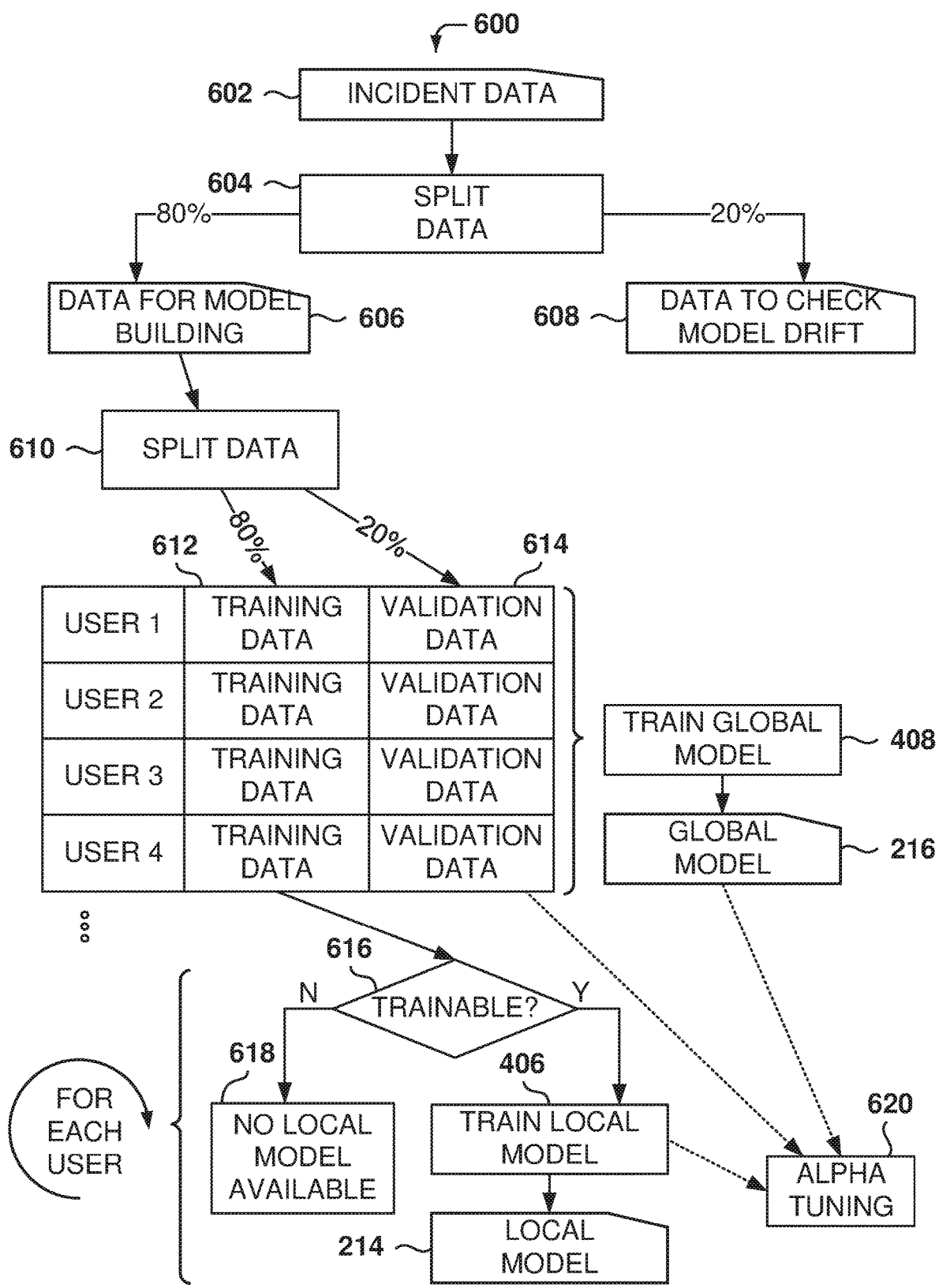
FIG. 6 is a flowchart of a method for using local and global models, according to some example embodiments.

FIG. 6 is a flowchart of a method 600 for using local and global models, according to some example embodiments. The incident data 602 includes the data for the previously-resolved incidents. In some example embodiments, the data from a predetermined period is used, such as the most recent month, trimester, year, etc.

Capturing the security analyst judgments is very valuable for the training set because it incorporates the knowledge of these security experts, who may spend hours trying to identify is a problem is a real threat. Further, by capturing the judgments from many security analysts makes the model more robust because of the diversity of opinions from multiple experts.

At operation 604, the incident data 602 is split into two sets: a first set with data for model building 606, and a second set with data to check model drift 608. In some example embodiments, the data for model building 606 includes 80% of the incident data 602, and the data to check model drift 608 includes 20%; however, other embodiments may use different percentages for the split.

Further, at operation 610, the data for model building 606 is split into training data 612 (e.g., 80%) and validation data 614 (e.g., 20%), which is used to test the model after the model is trained. Further, the training and validation data are organized by user (e.g., user 1, user 2).

At operation 408, the global model 216 is trained using the training data 612 from all the users, or from a subset of the users. For each user, at operation 616, a check is made to determine if there is enough training data 612 to generate the local model 214 for that user. If there is enough training data 612 to generate the local model 214, the local model 214 is trained at operation 406 (FIG. 4) with the training data 612 of the user. However, if there is not enough training data 612 for that user, then the local model 214 will not be available 618 for that user, that is, the $\alpha$ parameter value for this user will be set to 1, so in equation (1), CS(i)=G(i), that is, the confidence score will be equal to the score obtained by the global model 216.

If the local model 214 is available, then, at operation 620, the $\alpha$ hyperparameter is tuned for each customer in order to obtain the best $\alpha$ that produces the most-accurate results for each user. The value of $\alpha$ may vary considerably from customer to customer. For example, a given customer may have unusual internal standards for what is labeled as true positive or false positive. The hyperparameter tuning for $\alpha$ takes into account these differences to select the $\alpha$ for each customer that places more or less weight on the local model based on each customer's practices.

The $\alpha$ tuning for each customer utilizes the validation data 614 of the customer. In some example embodiments, a grid search over a predefined set of candidate $\alpha$ values is used, and the $\alpha$ value that maximizes the performance for the CS(i) in equation (1) is selected for each customer.

In some example embodiments, each entry in the validation data is passed through the global model 216 and the local model 214 to obtain the two estimates L(i) and G(i). Then, different values of a (e.g., 0.1, 0.2, 0.3, 0.4, ... 0.9) are evaluated to get the confident score CS(i) using equation (1). The CS(i) for each a is compared to the actual value on the validation data 614, and the accuracy for all the entries in the validation data 614 is calculated, such as by using statistical measures (e.g., standard deviation, average differences, median differences, etc.).

The $\alpha$ that generates the best accuracy is selected for the user. In some example embodiments, one or more iterations may be performed based on the selected value of $\alpha$. For example, if the best $\alpha$ is 0.4, then a new iteration may explore values around 0.4, such as 0.35, 0.36, ..., 0.45. The number of iterations may be a maximum predefined number, or until a minimum level of accuracy is achieved. Once the iterations end, the value of the $\alpha$ that is more accurate for each customer is selected. The $\alpha$-selection process is repeated periodically using the most recent training data 612 and validation data 614.

Figure 7:
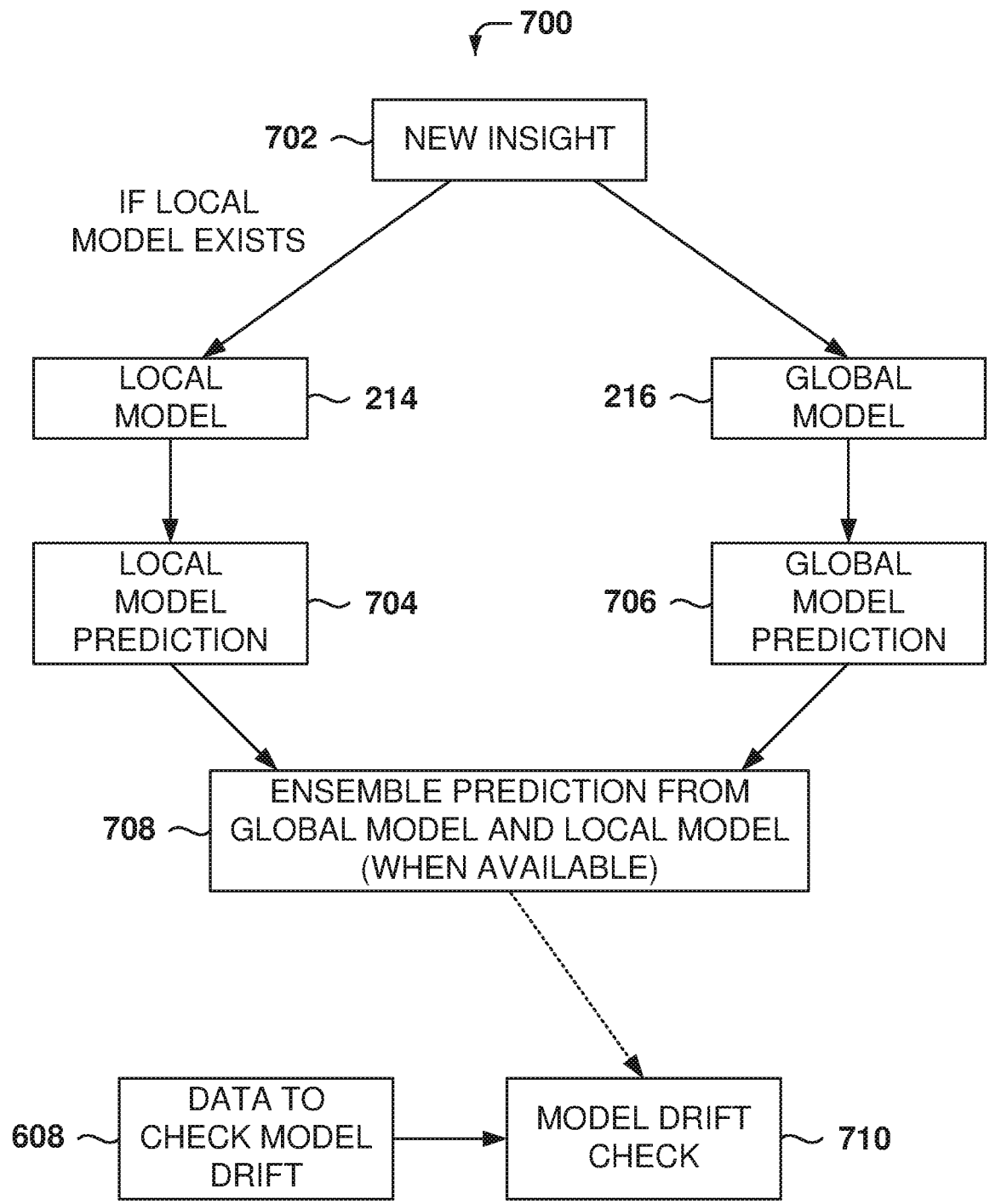
FIG. 7 is a flowchart of a method for estimating the incident confidence score, according to some example embodiments.

FIG. 7 is a flowchart of a method 700 for estimating the incident confidence score, according to some example embodiments. A new insight 702 i is detected. If a local model 214 exists, the local model prediction 704 is calculated, that is, the local-model insight score L(i). Additionally, the global model prediction 706 is calculated, that is, the global-model insight score G(i).

At operation 708, an ensemble prediction (the confidence score 108) is calculated based on the local-model insight score (if available) and the global-model insight score. In some example embodiments, the ensemble is calculated using equation (1), but other combinations may be possible, such as an average, a geometric average, a maximum, a minimum, etc. The result is the confidence level CS(i).

The accuracy of the models is estimated periodically to make sure that it remains at an adequate level. In some example embodiments, the training set uses the data from the trailing 30 days, or some other predetermined period of time. This way, the models are updated to capture some of the new insights and possible threats that occur in the system.

However, there could be a problem with an updated model if the model is performing poorly for some reason (e.g., problem with software, problem with data capture). In this case, the new model is updated, and the old model is reinstated for calculating confidence scores 108.

To determine this possible drift in the accuracy of the models, the data to check model drift 608 is used, which is data that is not being used for training or validation. And at operation 710, a model drift check is performed, which is an estimation of the true generalization performance of the models.

Model drift evaluation is done by comparing current statistical values (for metrics like F1, recall, precision, accuracy, and calibration curve) to the confidence interval generated from the previous run with 25 ensemble models. An alert is generated for model drift if the score of any of F1, recall, precision, or accuracy are degraded.

FIG. 8 is a table 802 illustrating the use of local and global models based on the availability of user and vendor rules, according to some example embodiments. The table 802 has headers on the first row indicating the conditions to determine how to use the global model. The rows include which model ensemble to use based on the values of the respective conditions.

The rules that generate the signals for the insights may be vendor rules (provided by the system vendor offering the insight tools) and user rules (custom made by each user).

When there are between 0 and 50 data points (e.g., labeled insights) by a user within the observation period (e.g., 30 days, but other periods also possible), no local model is used because there is not enough training data to generate the local model. In some example embodiments, the observation period may be expanded in order to get sufficient data to train the local model. When there are more than 50 data points in the observation period, these are trainable tenants, which means that the local model is created for each tenant with more than 50 data points.

By having the global model for tenants with few data points, new users are able to benefit from the global model from the moment they start the service so they can get rated insights on their insight tool.

Columns three to six further define how the models and the features used for the model are defined. In column three, for the 0-50 tenants, when the prediction behavior includes previously seen vendor rules (there are labeled insights for those rules in the training data), then the global model is used with the standard features. For the greater-than-fifty tenants, the ensemble of local and global models is used (e.g., by using equation (1)).

The fourth column is for cases when there are previously unseen vendor rules. In this case, for the 0-50 tenants, the global model is used but the features associated with the unseen vendor rules are not used for the global model. For the greater-than-fifty tenants, the ensemble of the local and global models is used without using the unseen vendor rules.

The fifth column is for cases when there are previously seen user rules. In this case, for the 0-50 tenants, the global model is used but the features associated with the seen user rules are not used for the global model. For the greater-than-fifty tenants, the ensemble of the local and global models is used.

The last column is for cases when there are previously unseen user rules. In this case, for the 0-50 tenants, the global model is used but the features associated with the unseen user rules are not used for the global model. For the greater-than-fifty tenants, the ensemble of the local and global models is used without using the unseen user rules.

Figure 9:
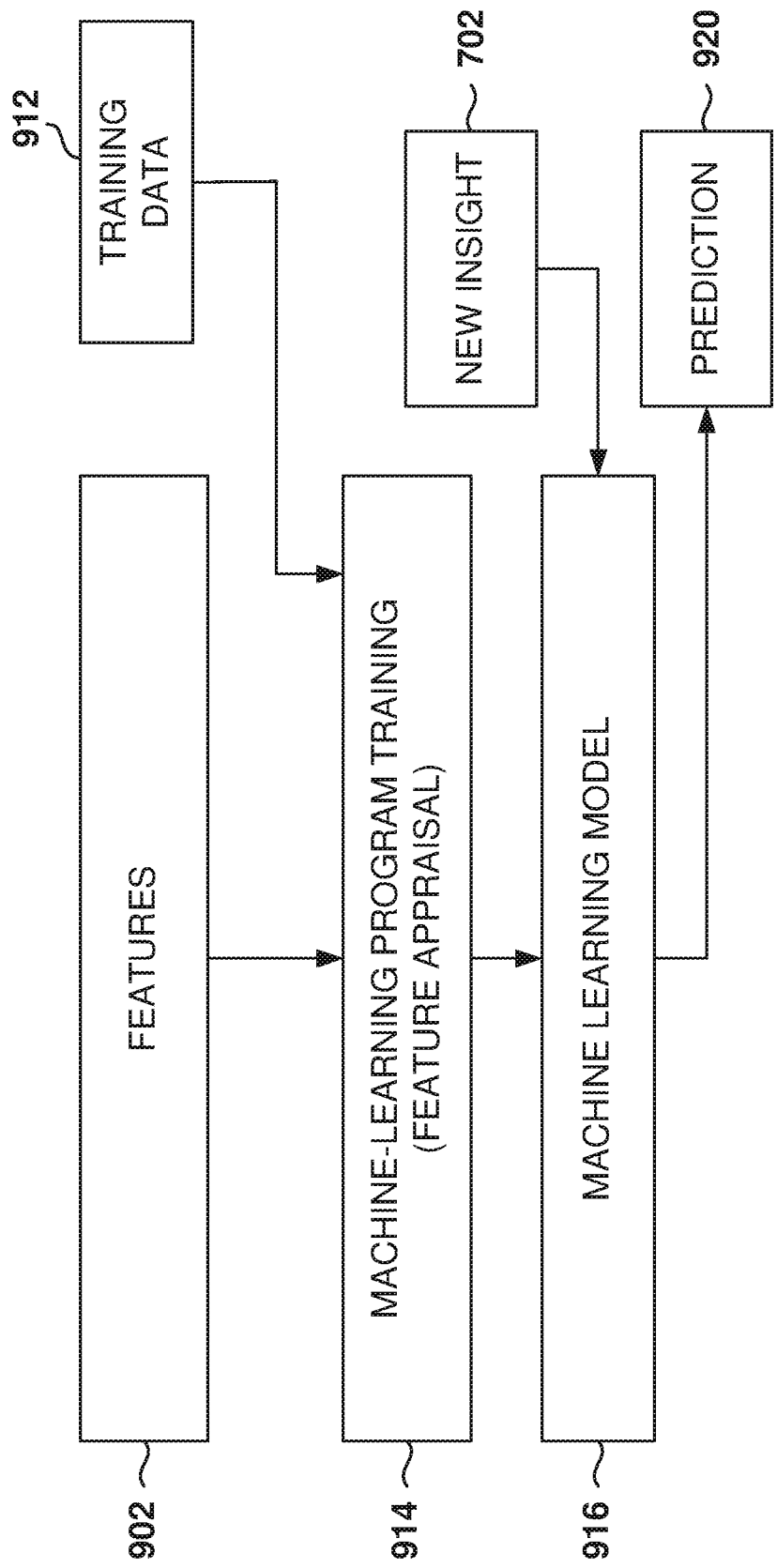
FIG. 9 illustrates the training and use of a machine-learning model, according to some example embodiments.

FIG. 9 illustrates the training and use of a machine-learning model, according to some example embodiments. In some example embodiments, machine-learning (ML) models 916 are utilized to calculate confidence scores.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 916 from example training data 912 in order to make data-driven predictions or decisions expressed as outputs or predictions 920. Although example embodiments are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naïve-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

In some embodiments, an example ML model provides a local confidence score (e.g., a number from 1 to 100, a real number between 0 and 1), and another ML model provides a global confidence score (e.g., a number from 1 to 100, a real number between 0 and 1).

The training data 912 comprises examples of values for the features 902. In some example embodiments, the training data 912 comprises labeled data with examples of values for the features 902 and labels indicating the outcome, such as an insight resolution as a true positive or a false positive. The machine-learning algorithms utilize the training data 912 to find correlations among identified features 902 that affect the outcome.

In one example embodiment, the features 902 may be of different types and may include one or more of the features 502 described above with reference to FIG. 5.

During training 914, the ML program, also referred to as ML algorithm or ML tool, analyzes the training data 912 based on identified features 902 and configuration parameters defined for the training 914. The result of the training 914 is the ML model 916 that is capable of taking inputs to produce assessments.

Training an ML algorithm involves analyzing large amounts of data (e.g., from several gigabytes to a terabyte or more) in order to find data correlations. The ML algorithms utilize the training data 912 to find correlations among the identified features 902 that affect the outcome or prediction 920. In some example embodiments, the training data 912 includes labeled data with the insight resolution.

In one example embodiment, the ML model 916 is a Logistic Regression defined as follows:

```
parameters = {'penalty':('l1', 'l2'), 'C':[1, 10, 100]}
    lr = LogisticRegression(random_state=0, solver='saga',
        max_iter=max_iter)
    clf = GridSearchCV(lr, parameters, cv=3,
        scoring=params.scoring, n_jobs=params.n_jobs,
        return_train_score=True)
    9 = clf.fit(features, labels)
```

The ML algorithms usually explore many possible functions and parameters before finding what the ML algorithms identify to be the best correlations within the data; therefore, training may make use of large amounts of computing resources and time.

When the ML model 916 is used to perform an assessment, new insight 702 is provided as an input to the ML model 916, and the ML model 916 generates the prediction 920 as output. For example, the input of the ML model 916 includes values for the features 502 of FIG. 5 except for the insight outcome 524, and the output is the confidence label.

In some example embodiments, results obtained by the model 916 during operation (e.g., prediction 920 produced by the model 916 in response to inputs) are used to improve the training data 912, which is then used to generate a newer version of the model. Thus, a feedback loop is formed to use the results obtained by the model to improve the model.

Figure 10:
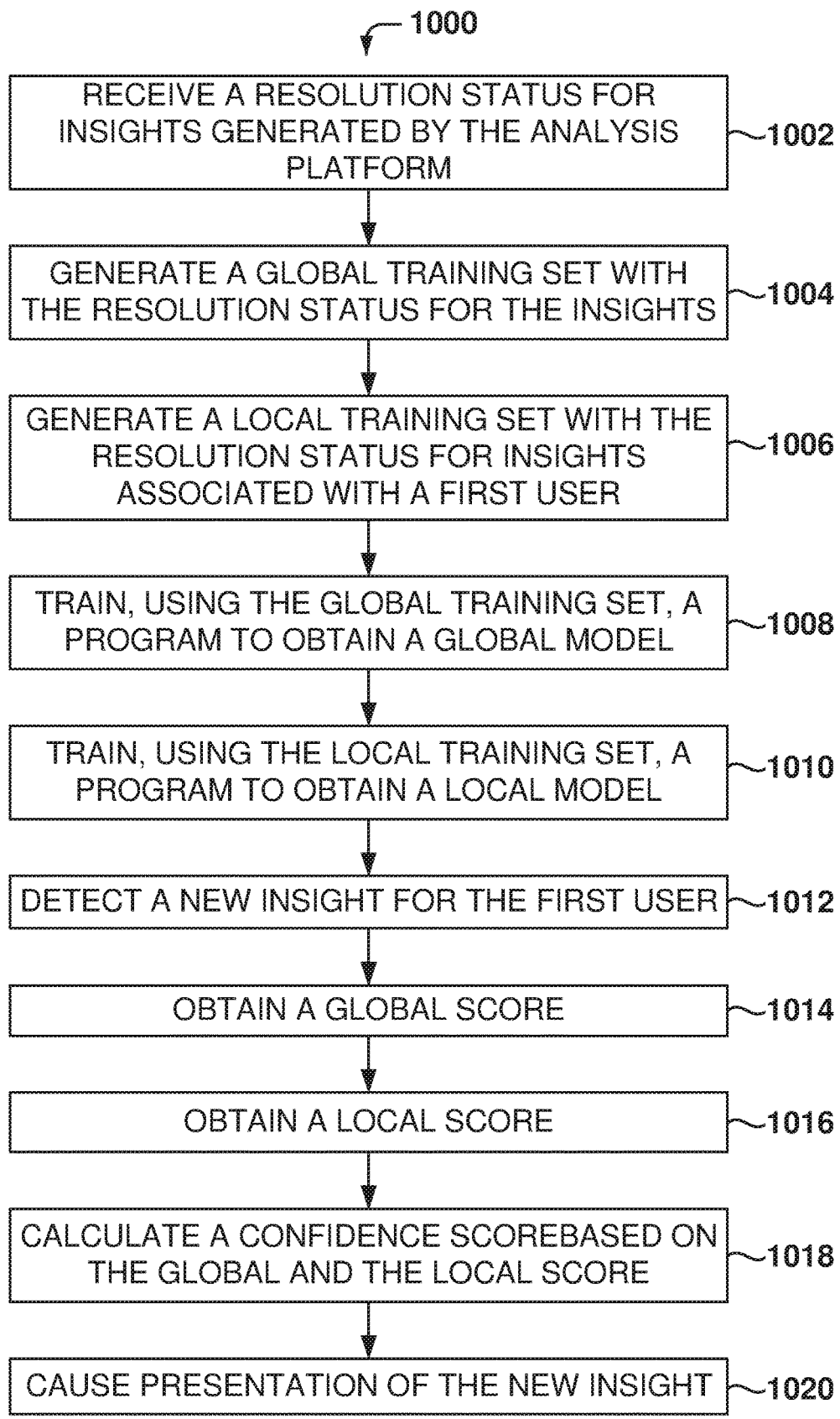
FIG. 10 is a flowchart of a method for automatic evaluation of security-related incidents, according to some example embodiments.

FIG. 10 is a flowchart of a method 1000 for automatic evaluation of security-related incidents, according to some example embodiments. While the various operations in this flowchart are presented and described sequentially, one of ordinary skill will appreciate that some or all of the operations may be executed in a different order, be combined or omitted, or be executed in parallel.

Operation 1002 is for receiving, by an analysis platform, a resolution status for a plurality of insights generated by the analysis platform. The resolution status indicates if each insight was a true positive or a false positive.

From operation 1002, the method 1000 flows to operation 1004 to generate a global training set comprising the resolution status for the plurality of insights.

From operation 1004, the method 1000 flows to operation 1006 to generate a local training set comprising the resolution status for a subset of the plurality of insights associated with a first user.

From operation 1006, the method 1000 flows to operation 1008 for training, using the global training set, a machine-learning program to obtain a global model.

From operation 1008, the method 1000 flows to operation 1010 for training, using the local training set, a machine-learning program to obtain a local model for the first user.

From operation 1010, the method 1000 flows to operation 1012 for detecting, by the analysis platform, a new insight for the first user.

From operation 1012, the method 1000 flows to operation 1014 to obtain, using the global model, a global score for the new insight.

From operation 1014, the method 1000 flows to operation 1016 to obtain, using the local model, a local score for the new insight.

From operation 1016, the method 1000 flows to operation 1018 for calculating a confidence score for the new insight based on the global score and the local score, the confidence score being an indication of an estimated severity of the new insight.

From operation 1018, the method 1000 flows to operation 1020 for causing presentation of the new insight and the confidence score on a display.

In one example, the global training set comprises values for a plurality of features, the plurality of features comprising an indicator if the insight was a true positive or a false positive, an identifier of a product associated with the insight, an entity associated with the insight, at least one mitre tactic, and a set of rules that triggered the insight.

In one example, the insight is an indication of a security incident based on detection rules.

In one example, the insight is generated when a combination of signals is identified, each signal being generated when a corresponding detection rule is triggered.

In one example, calculating the confidence score comprises adding the global score factored by a mixing parameter with the local score factored by one minus the mixing parameter.

In one example, an input to the global model includes values for a plurality of features associated with the insight and an output includes the global score.

In one example, calculating the confidence score comprises making the confidence score equal to the global score when a number of entries in the local training set is below a predetermined threshold.

In one example, generating the global training set comprises discarding from the global training set entries including previously unseen vendor rules.

In one example, the method 1000 further comprises reserving a subset of the plurality of insights for checking a global-model drift over time.

In one example, the method 1000 further comprises reserving a subset of the plurality of insights for validating the global model.

Another general aspect is for a system that includes a memory comprising instructions and one or more computer processors. The instructions, when executed by the one or more computer processors, cause the one or more computer processors to perform operations comprising: receiving, by an analysis platform, a resolution status for a plurality of insights generated by the analysis platform, the resolution status indicating if each insight was a true positive or a false positive; generating a global training set comprising the resolution status for the plurality of insights; generating a local training set comprising the resolution status for a subset of the plurality of insights associated with a first user; training, using the global training set, a machine-learning program to obtain a global model; training, using the local training set, a machine-learning program to obtain a local model for the first user; detecting, by the analysis platform, a new insight for the first user; obtaining, using the global model, a global score for the new insight; obtaining, using the local model, a local score for the new insight; calculating a confidence score for the new insight based on the global score and the local score, the confidence score being an indication of an estimated severity of the new insight; and causing presentation of the new insight and the confidence score on a display.

In yet another general aspect, a tangible machine-readable storage medium (e.g., a non-transitory storage medium) includes instructions that, when executed by a machine, cause the machine to perform operations comprising: receiving, by an analysis platform, a resolution status for a plurality of insights generated by the analysis platform, the resolution status indicating if each insight was a true positive or a false positive; generating a global training set comprising the resolution status for the plurality of insights; generating a local training set comprising the resolution status for a subset of the plurality of insights associated with a first user; training, using the global training set, a machine-learning program to obtain a global model; training, using the local training set, a machine-learning program to obtain a local model for the first user; detecting, by the analysis platform, a new insight for the first user; obtaining, using the global model, a global score for the new insight; obtaining, using the local model, a local score for the new insight; calculating a confidence score for the new insight based on the global score and the local score, the confidence score being an indication of an estimated severity of the new insight; and causing presentation of the new insight and the confidence score on a display.

Figure 11:
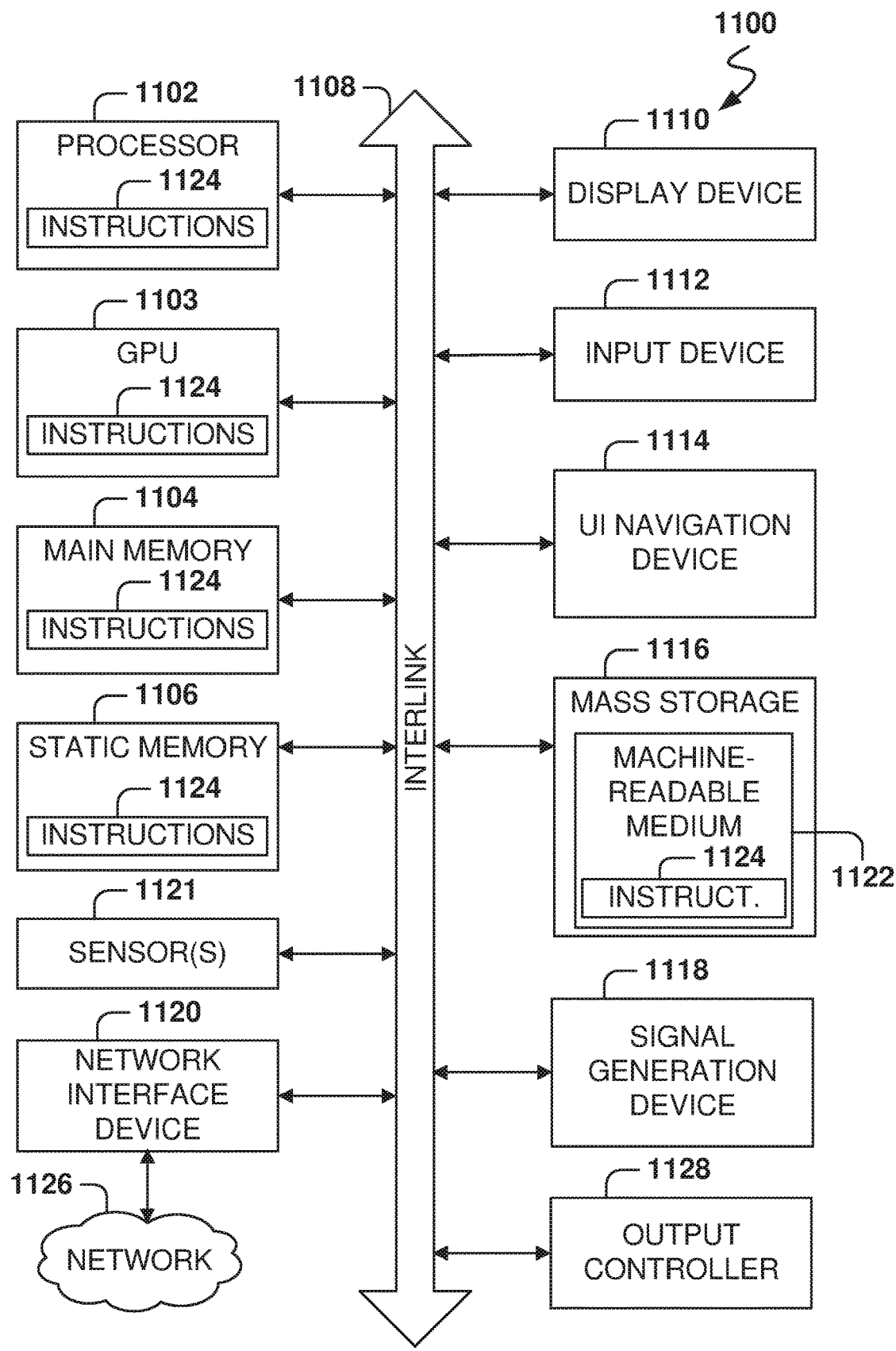
FIG. 11 is a block diagram illustrating an example of a machine upon or by which one or more example process embodiments described herein may be implemented or controlled.

FIG. 11 is a block diagram illustrating an example of a machine 1100 upon or by which one or more example process embodiments described herein may be implemented or controlled. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in a peer-to-peer (P2P) (or other distributed) network environment. Further, while only a single machine 1100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a hardware processor core, or any combination thereof), a graphics processing unit (GPU) 1103, a main memory 1104, and a static memory 1106, some or all of which may communicate with each other via an interlink (e.g., bus) 1108. The machine 1100 may further include a display device 1110, an alphanumeric input device 1112 (e.g., a keyboard), and a user interface (UI) navigation device 1114 (e.g., a mouse). In an example, the display device 1110, alphanumeric input device 1112, and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a Global Positioning System (GPS) sensor, compass, accelerometer, or another sensor. The machine 1100 may include an output controller 1128, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, within the hardware processor 1102, or within the GPU 1103 during execution thereof by the machine 1100. In an example, one or any combination of the hardware processor 1102, the GPU 1103, the main memory 1104, the static memory 1106, or the mass storage device 1116 may constitute machine-readable media.

While the machine-readable medium 1122 is illustrated as a single medium, the term "machine-readable medium" may include a single medium, or multiple media, (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding, or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    receiving, by an analysis platform, a resolution status for a plurality of insights generated by the analysis platform, the resolution status indicating if each insight was a true positive or a false positive;
    generating a global training set comprising the resolution status for the plurality of insights;
    generating a local training set comprising the resolution status for a subset of the plurality of insights associated with a first user;
    training, using the global training set, a machine-learning program to obtain a global model;
    training, using the local training set, a machine-learning program to obtain a local model for the first user;
    detecting, by the analysis platform, a new insight for the first user;
    obtaining, using the global model, a global score for the new insight;
    obtaining, using the local model, a local score for the new insight;
    calculating a confidence score for the new insight based on the global score and the local score, the confidence score being an indication of an estimated severity of the new insight; and
    causing presentation of the new insight and the confidence score on a display.

2. The method as recited in claim 1, wherein the global training set comprises values for a plurality of features, the plurality of features comprising an indicator if the insight was a true positive or a false positive, an identifier of a product associated with the insight, an entity associated with the insight, at least one mitre tactic, and a set of rules that triggered the insight.

3. The method as recited in claim 1, wherein the insight is an indication of a security incident based on detection rules.

4. The method as recited in claim 1, wherein the insight is generated when a combination of signals is identified, each signal being generated when a corresponding detection rule is triggered.

5. The method as recited in claim 1, wherein calculating the confidence score comprises:
    adding the global score factored by a mixing parameter with the local score factored by one minus the mixing parameter.

6. The method as recited in claim 1, wherein an input to the global model includes values for a plurality of features associated with the insight and an output includes the global score.

7. The method as recited in claim 1, wherein calculating the confidence score comprises:
    making the confidence score equal to the global score when a number of entries in the local training set is below a predetermined threshold.

8. The method as recited in claim 1, wherein generating the global training set comprises:
    discarding from the global training set entries including previously unseen vendor rules.

9. The method as recited in claim 1, further comprising:
    reserving a subset of the plurality of insights for checking global model drift over time.

10. The method as recited in claim 1, further comprising:
    reserving a subset of the plurality of insights for validating the global model.

11. A system comprising:
    a memory comprising instructions; and
    one or more computer processors, wherein the instructions, when executed by the one or more computer processors, cause the system to perform operations comprising:
        receiving, by an analysis platform, a resolution status for a plurality of insights generated by the analysis platform, the resolution status indicating if each insight was a true positive or a false positive;
        generating a global training set comprising the resolution status for the plurality of insights;
        generating a local training set comprising the resolution status for a subset of the plurality of insights associated with a first user;
        training, using the global training set, a machine-learning program to obtain a global model;
        training, using the local training set, a machine-learning program to obtain a local model for the first user;
        detecting, by the analysis platform, a new insight for the first user;
        obtaining, using the global model, a global score for the new insight;
        obtaining, using the local model, a local score for the new insight;
        calculating a confidence score for the new insight based on the global score and the local score, the confidence score being an indication of an estimated severity of the new insight; and
        causing presentation of the new insight and the confidence score on a display.

12. The system as recited in claim 11, wherein the global training set comprises values for a plurality of features, the plurality of features comprising an indicator if the insight was a true positive or a false positive, an identifier of a product associated with the insight, an entity associated with the insight, at least one mitre tactic, and a set of rules that triggered the insight.

13. The system as recited in claim 11, wherein the insight is an indication of a security incident based on detection rules.

14. The system as recited in claim 11, wherein the insight is generated when a combination of signals is identified, each signal being generated when a corresponding detection rule is triggered.

15. The system as recited in claim 11, wherein calculating the confidence score comprises:
adding the global score factored by a mixing parameter with the local score factored by one minus the mixing parameter.

16. A tangible machine-readable storage medium including instructions that, when executed by a machine, cause the machine to perform operations comprising:
receiving, by an analysis platform, a resolution status for a plurality of insights generated by the analysis platform, the resolution status indicating if each insight was a true positive or a false positive;
generating a global training set comprising the resolution status for the plurality of insights;
generating a local training set comprising the resolution status for a subset of the plurality of insights associated with a first user;
training, using the global training set, a machine-learning program to obtain a global model;
training, using the local training set, a machine-learning program to obtain a local model for the first user;
detecting, by the analysis platform, a new insight for the first user;
obtaining, using the global model, a global score for the new insight;
obtaining, using the local model, a local score for the new insight;
calculating a confidence score for the new insight based on the global score and the local score, the confidence score being an indication of an estimated severity of the new insight; and
causing presentation of the new insight and the confidence score on a display.

17. The tangible machine-readable storage medium as recited in claim 16, wherein the global training set comprises values for a plurality of features, the plurality of features comprising an indicator if the insight was a true positive or a false positive, an identifier of a product associated with the insight, an entity associated with the insight, at least one mitre tactic, and a set of rules that triggered the insight.

18. The tangible machine-readable storage medium as recited in claim 16, wherein the insight is an indication of a security incident based on detection rules.

19. The tangible machine-readable storage medium as recited in claim 16, wherein the insight is generated when a combination of signals is identified, each signal being generated when a corresponding detection rule is triggered.

20. The tangible machine-readable storage medium as recited in claim 16, wherein calculating the confidence score comprises:
adding the global score factored by a mixing parameter with the local score factored by one minus the mixing parameter.

* * * * *